Figure 4:
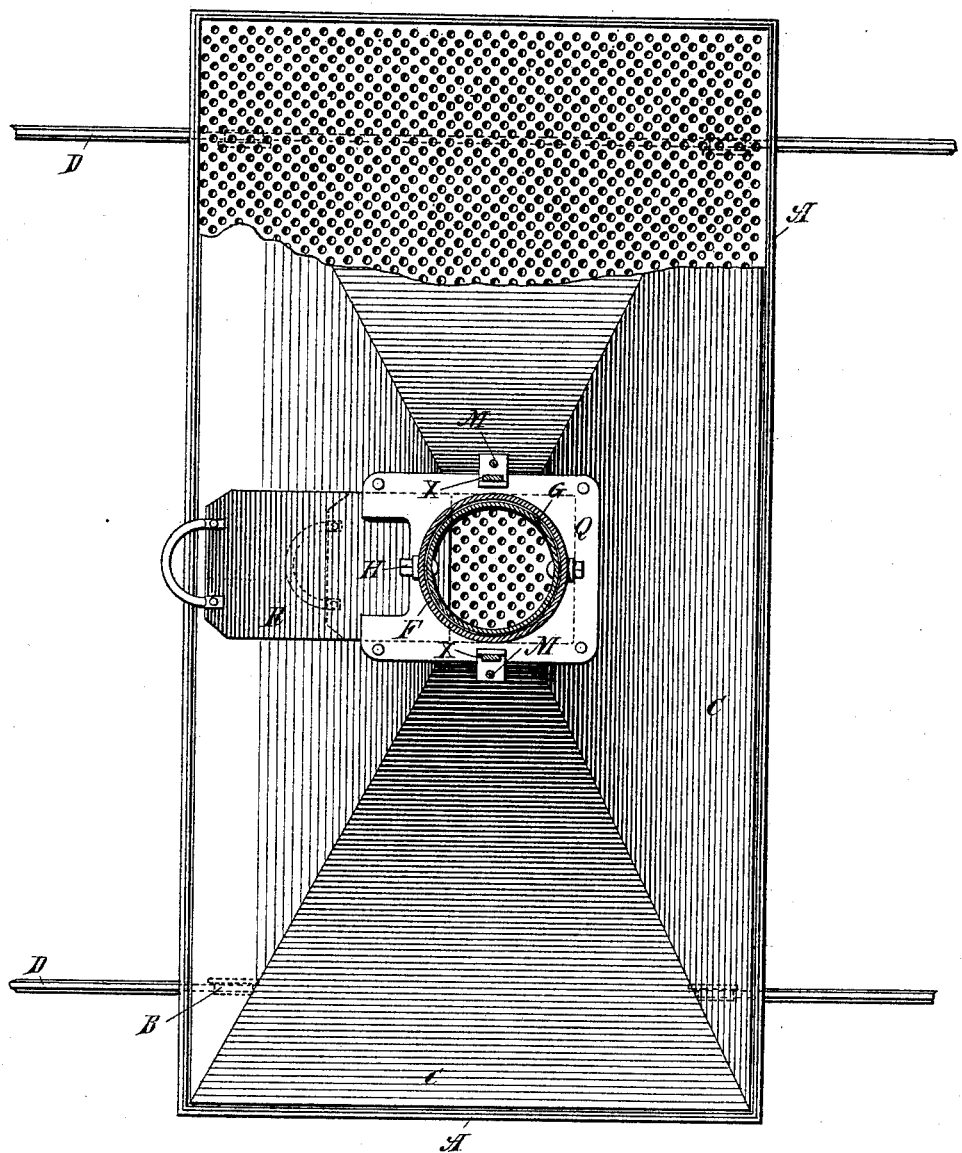

No. 619,297. Patented Feb. 14, 1899.
D. B. FRASER.
APPARATUS FOR COOLING ROASTED COFFEE.
(Application filed Apr. 6, 1898.)
(No Model.) 2 Sheets—Sheet 1.
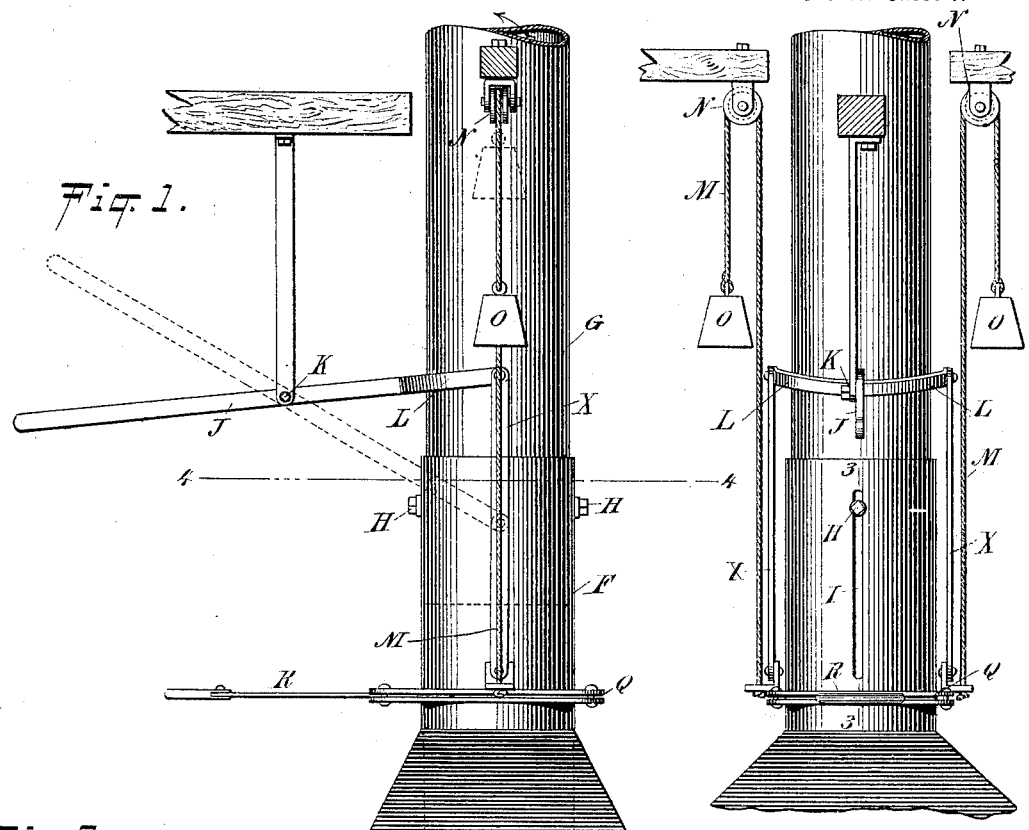
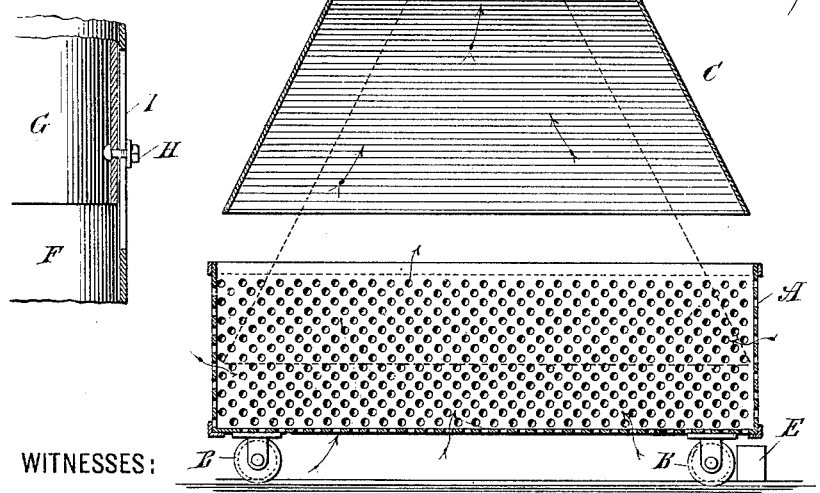
WITNESSES:
William P. Gaebel.
E. Jos. Belknap.
INVENTOR
David B. Fraser,
BY
Chas. C. Gill
ATTORNEY No. 619,297. Patented Feb. 14, 1899.
D. B. FRASER.
APPARATUS FOR COOLING ROASTED COFFEE.
(Application filed Apr. 6, 1898.)
(No Model.) 2 Sheets—Sheet 2.

WITNESSES:
William P. Goebel.
E. Jos. Belknap.

INVENTOR
David B. Fraser,
BY
Chas. C. Gill
ATTORNEY

UNITED STATES PATENT OFFICE.

DAVID B. FRASER, OF NEW YORK, N. Y.

APPARATUS FOR COOLING ROASTED COFFEE.

SPECIFICATION forming part of Letters Patent No. 619,297, dated February 14, 1899.

Application filed April 6, 1898. Serial No. 676,618. (No model.)

*To all whom it may concern:*

Be it known that I, DAVID B. FRASER, a subject of Her Majesty the Queen of Great Britain, and a resident of New York, in the county of New York and State of New York, have invented certain new and useful Improvements in Apparatus for Cooling Roasted Coffee, of which the following is a specification.

The invention relates to improvements in apparatus for cooling roasted coffee, and comprises a cooling-box of novel construction which receives the coffee from the roaster, an adjustable hood adapted to said box and capable of being lowered to cover the coffee within the same and thereafter elevated free of said box, and suction apparatus connected with said hood, whereby the air may be caused to pass through said box and the coffee therein and thence ascend upward through said hood.

One of the main objects of the present invention is to provide an apparatus for cooling coffee by means which will avoid the passage of the hot air and gases through any portion of the perforated receptacle holding the coffee and by which the cool external air will first be caused to pass through the perforated surfaces of said receptacle, thence ascend through the coffee into the hood covering the coffee, and thence through the suction apparatus, by which the heated air, gases, and chaff are conducted from the roasting-room.

The invention will be more fully understood from the detailed description hereinafter presented, reference being had to the accompanying drawings, in which—

Figure 1 is a side elevation, partly in central vertical section, of cooling apparatus constructed in accordance with and embodying the invention, the hood being shown in its elevated position by full lines and in a lower position by dotted lines. Fig. 2 is a detached elevation looking at the left-hand side of Fig. 1 and showing a portion of the hood and the means for elevating and lowering said hood. Fig. 3 is a central vertical section through a portion of the hood and the pipe with which it is connected and discloses the means for guiding the hood upon said pipe; and Fig. 4 is an enlarged horizontal section of said apparatus on the dotted line 4 4 of Fig. 1, a portion of the hood in this figure being broken away to disclose the cooling-box below the same.

In the drawings, A designates the cooling-box, which is of oblong form and has the perforated sides, ends, and bottom shown. The cooling-box A is provided with wheels B, upon which it may be moved from place to place, and said wheels will preferably be grooved, as indicated by dotted lines in Fig. 1, or given other suitable form adapting them to move upon rails or tracks, this being preferable for the reason that when the box A is thus mounted upon a track it may with certainty be brought directly under the hood C with the least possible attention on the part of the attendants. In Fig. 1 the box A is shown upon the track D and directly below the hood C, and upon the floor of the roasting-room will preferably be provided a stop E, against which the box A may be moved and which will stop said box when the latter is in proper position below the hood C.

The box A is preferably formed wholly of perforated sheet metal and is strengthened along its upper and lower edges by suitable bands, as illustrated in Fig. 1.

The hood C at its lower end is rectangular in outline and corresponds with the shape of the box A, and the lower edges of the hood C are so proportioned that when the hood is lowered they will enter but closely fit the outline of the box A, as indicated by dotted lines in Fig. 1 and by the full lines in Fig. 4. At the upper central portion of the hood C and connected with said hood is the neck F, which passes upon the lower end of the blast-pipe G and is guided thereon by means of the bolts H, which extend through the elongated vertical guiding-slots I, formed in said neck F, as clearly illustrated in Figs. 2 and 3. The blast-pipe G is stationary, and the neck F, carrying the hood C, is movable upon said pipe, and for the purpose of enabling the convenient raising and lowering of the hood C, I provide the lever J, pivoted at K and having the arms L of its inner bifurcated end extending partly around the blast-pipe G and connected by the links X with the frame Q for the blast-gate R. The frame Q and blast-gate R are carried by the neck F, which is integral with the hood C. By moving the outer end of the lever J upward to the position in which it is illustrated in Fig. 1 the arms L and links X are depressed and effect the lowering of the hood C toward the cooling-box A, said hood C being adapted to have a variable extent of motion in order that it may be lowered to the surface of the coffee within the cooling-box A whether said coffee only partly fills said box A or completely fills the same. The reverse motion of the lever J from the position in which it is shown by dotted lines in Fig. 1 to the position in which it is shown by full lines in said figure results in the hood C being elevated.

In order to facilitate the convenient movement of the hood C, I provide the counterweights O and cords M, the lower ends of the cords being secured to the frame Q and thence extending upward around the pulleys N to the weights O, as clearly illustrated in Fig. 3. The weights O counterbalance the weight of the hood C, and hence the latter may be moved by the attendant with the least amount of labor.

In the employment of the invention the cooling-box A receives the hot coffee from the roaster, and the said box is then moved upon the track D to a point directly below and in vertical alinement with the then elevated hood C, and thereupon by means of the lever J the said hood C is lowered until its lower edge is in line with the upper surface of the body of coffee within the box A. The usual suction-fan being in motion, the blast-gate R will then be opened, and the result is that the external air will be drawn through the sides, ends, and bottom of the cooling-box A and thence ascend through the coffee within said box and be carried upward through the hood C and blast-pipe G, the heat from the coffee being thus extracted and carried away through the blast-pipe G. After the operation of cooling the coffee within the box A has been continued a sufficient length of time the blast-gate R will be closed, and the hood C, by means of the lever J, will be elevated above the box A, and thereupon the box A will be withdrawn from below the hood C and the coffee removed from said box.

By means of my invention the coffee within the box A is exposed throughout a large surface area to the action of the external air, and all of the heat extracted from the coffee is relieved from the coffee-roasting room by being drawn up through the blast-pipe G.

In accordance with my invention the coffee is to a maximum degree uniformly cooled, and the metallic surfaces of the box in contact with the coffee being directly exposed to the action of the external air said surfaces are kept from becoming heated to a sufficient extent to prejudicially affect the coffee.

What I claim as my invention, and desire to secure by Letters Patent, is—

1. In an apparatus for cooling roasted coffee, the box A elevated above the floor and having the exposed perforated bottom and sides, combined with the hood C conformed in outline to said box and adapted to be lowered to the surface of the coffee in said box so as to exclude the suction of air through that portion of the perforated sides of said box above said coffee, and the blast-pipe connected with said hood; substantially as and for the purposes set forth.

2. In apparatus for cooling roasted coffee, the box A having the exposed perforated bottom and sides and mounted upon the wheels, the track for the wheels of said box, and the stop for arresting said box at a definite point, combined with the hood conformed to the outline of said box and adapted to be lowered to the level of the coffee in said box so as to exclude the suction of air through that portion of said perforated sides above said coffee, the blast-pipe to which said hood is connected, means for guiding said hood on said pipe, the blast-gate for applying and cutting off the suction through said hood, and means for elevating and lowering said hood; substantially as set forth.

3. In apparatus for cooling roasted coffee, the box A having the exposed perforated bottom, the hood conformed to the outline of said box and adapted to be lowered to and elevated above said box, and the blast-pipe receiving the neck of said hood and upon which said hood is vertically adjustable, combined with the pivoted lever J at its inner end extending to the opposite sides of the said blast-pipe, the pivoted links X, X, connected at one end with said hood and at their upper ends to the arms of said lever J, the cords M extending from said hood upward over the pulleys N, and the weights O, O, suspended from the upper ends of said cords; substantially as set forth.

4. In apparatus for cooling roasted coffee, the portable box A having the exposed perforated bottom, combined with the hood conformed to the outline of said box and adapted to be lowered to and elevated above said box, and the blast-pipe to which said hood is connected and which is itself connected with means for creating air-suction up through said box, the coffee therein, said hood and said blast-pipe; substantially as and for the purposes set forth.

Signed at New York, in the county of New York and State of New York, this 31st day of March, A. D. 1898.

DAVID B. FRASER.

Witnesses:
CHAS. C. GILL,
E. JOS. BELKNAP.